No. 784,919. PATENTED MAR. 14, 1905.
N. BURGESS.
STAGE APPARATUS.
APPLICATION FILED JULY 16, 1902.
3 SHEETS—SHEET 1.
Fig. 1.
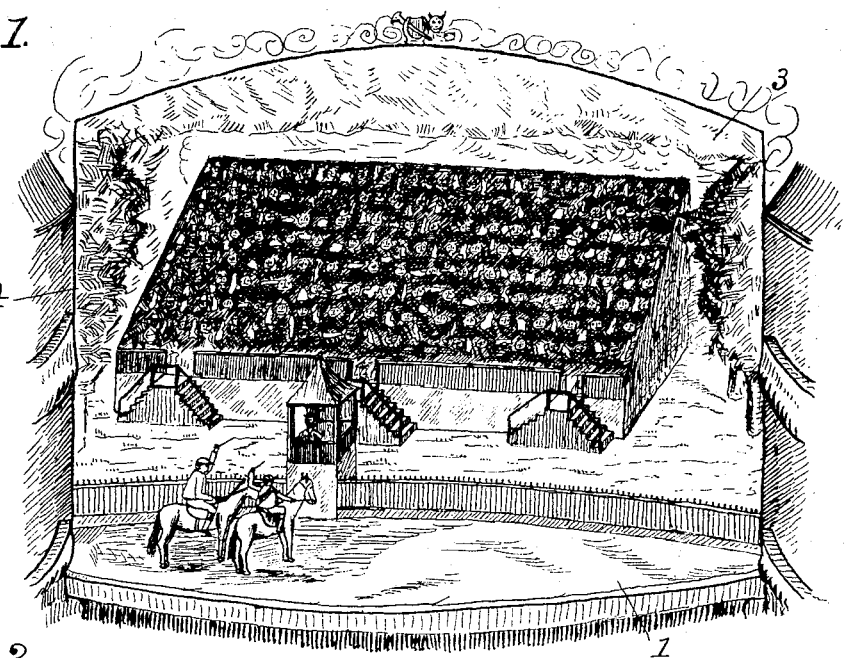
Fig. 2.
Fig. 6.
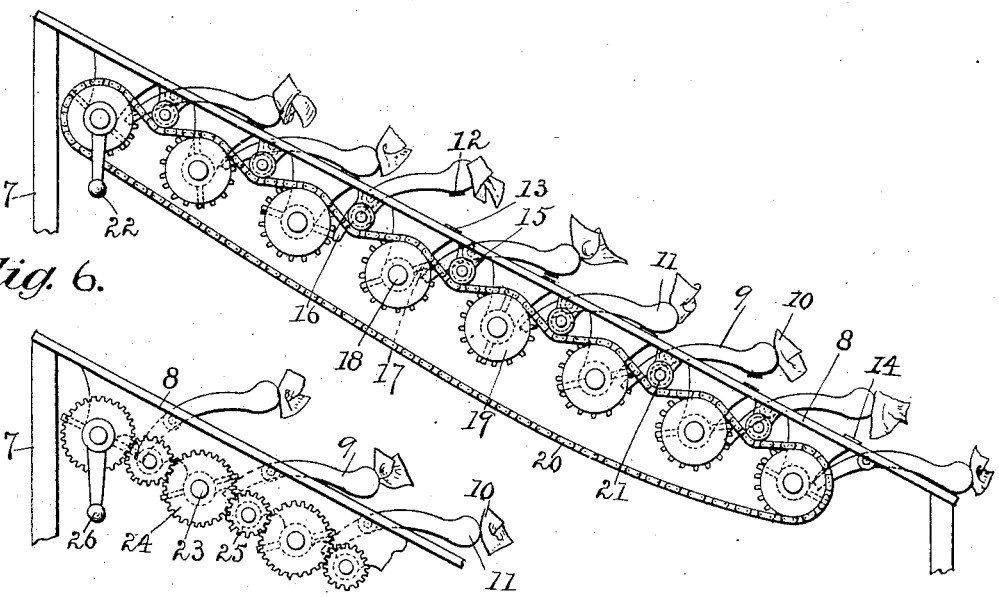
Witnesses:
Emma P. Coffin
Clara Morris
Inventor:
Neilson Burgess,
by Jenkins & Barker
Attorneys.

No. 784,919. PATENTED MAR. 14, 1905.
N. BURGESS.
STAGE APPARATUS.
APPLICATION FILED JULY 16, 1902.

3 SHEETS—SHEET 2.

Witnesses:
Emma P. Coffrun
Clara Morris

Inventor,
Neilson Burgess.
by Jenkins & Barker.
Attorneys.

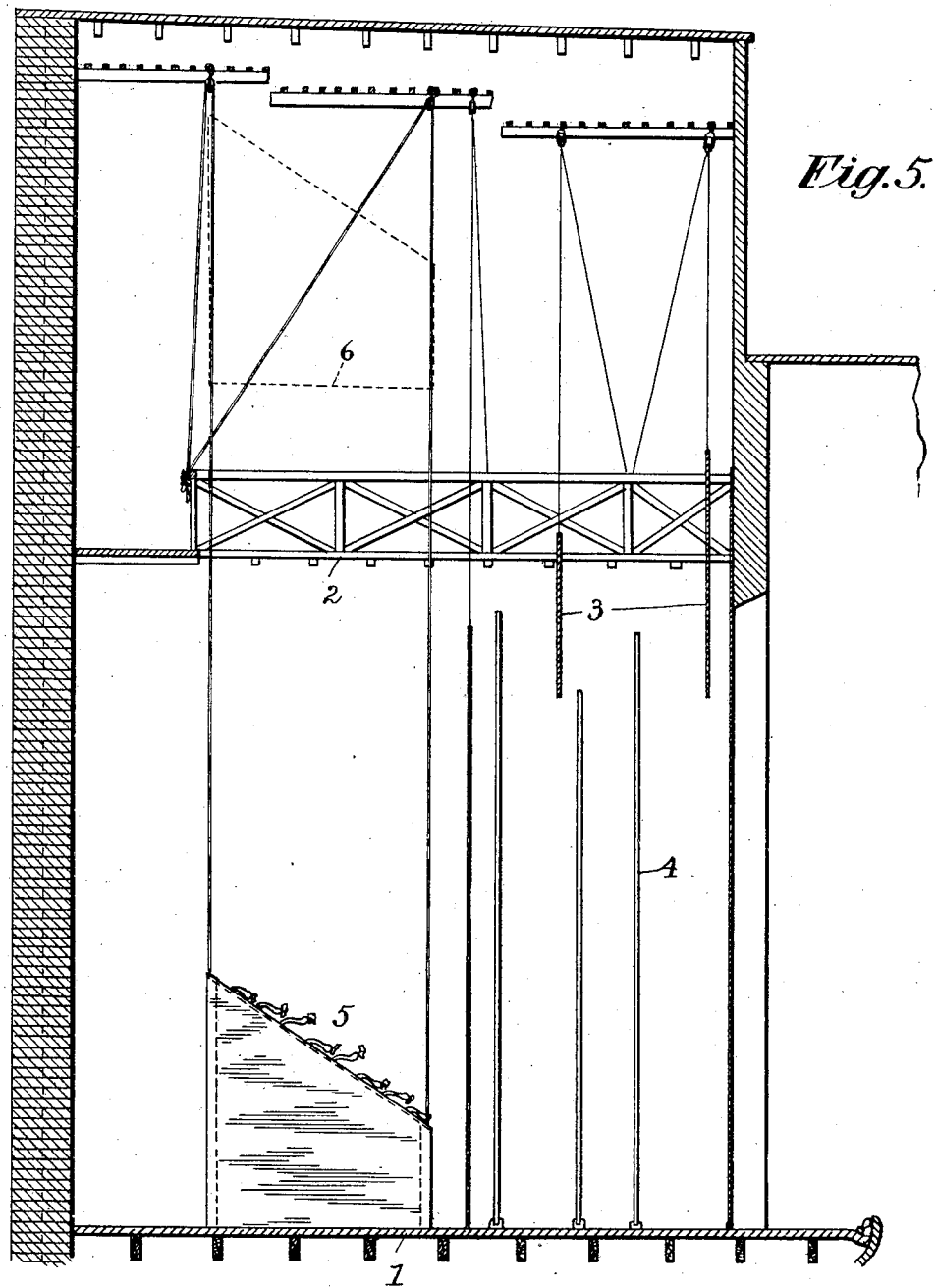

No. 784,919.

Patented March 14, 1905.

UNITED STATES PATENT OFFICE.

NEILSON BURGESS, OF HIGHLANDS, NEW JERSEY.

STAGE APPARATUS.

SPECIFICATION forming part of Letters Patent No. 784,919, dated March 14, 1905.

Application filed July 16, 1902. Serial No. 115,788.

*To all whom it may concern:*

Be it known that I, NEILSON BURGESS, a citizen of the United States, and a resident of Highlands, in the county of Monmouth and State of New Jersey, have invented certain new and useful Improvements in Stage Apparatus, of which the following is a specification.

The invention relates to stage apparatus for simulating certain effects, and relates more particularly to an apparatus for producing certain visual and audible effects and illusions.

The object of the invention is to simulate and portray as nearly as possible the effects produced by a multitude of people in certain states of excitement, and one of the principal objects is to represent and reproduce as nearly as possible the character of sounds and signs of a mass of people assembled to witness some particularly interesting feat.

Figure 3:
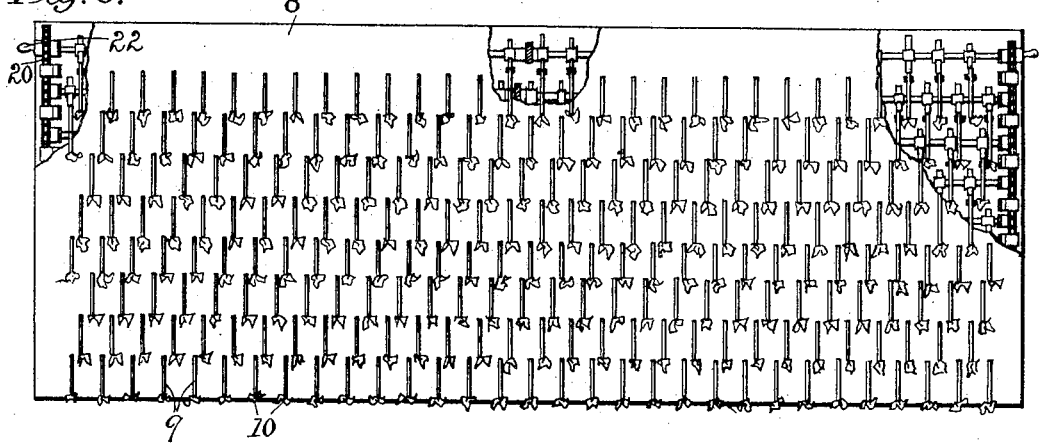
Figure 4:
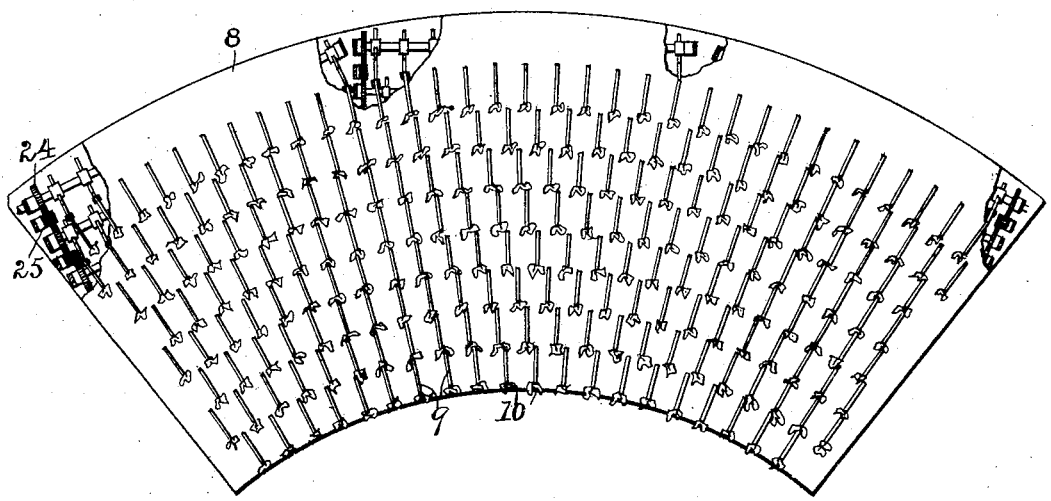

Referring to the drawings, Figure 1 is an illustrative view of the apparatus upon the stage of a theater. Fig. 2 is a detail view, on enlarged scale, showing certain of the mechanism in side elevation. Fig. 3 is a detail plan view of the parts shown in Fig. 2, but on a different scale. Fig. 4 is a plan view of the apparatus, showing a slightly-modified form of arrangement. Fig. 5 is a diagrammatic view of the stage of a theater in cross-section. Fig. 6 is a detail view showing a modified form of operating mechanism.

After a very careful study and experiments, both through observation and with the aid of a camera, it has been found that a mass of people assembled as upon the grand stand of a race-track or other place of amusement while applauding give a visual effect of a mass of flying color with a multitude of faces interposed and behind the moving mass of color.

From observations of photographs taken when a large assemblage of persons is showing its pleasure it has been found that only the faces and waving handkerchiefs make an appreciable showing, and it is one of the objects of this invention to produce the effect of a grand stand full of people encoring certain events, and this upon the stage of a theater.

In the accompanying drawings the numeral 1 denotes the stage; 2, the bridges; 3, the drops; 4, the set side pieces, and 5 the apparatus for producing the illusion. This apparatus 5 is suitably connected with hoisting means by which it may be drawn up into the flies and assume the position indicated in dotted outline, as at 6, whereby the stage will be left unencumbered after its use in any particular scene.

As shown in Fig. 1 of the drawings, the apparatus is used in connection with a race-track where it is desired to simulate the effects of a grand stand full of people encoring the racing horses. The apparatus consists, essentially, of a supporting-frame 7, which supports an inclined platform 8, and upon this platform at suitable intervals are painted faces of different character. This inclined platform 8, with its painted insignia, constitutes a pictorial background which of course is immovable and is used in connection with a movable foreground, comprising a series of arms or members arranged to have certain movements to cause the desired illusion in connection with the pictorial background. Between these faces of the pictorial background are a series of levers or arms 9, which may be arranged in any desired manner to produce the proper effects, and these arms or levers each bear bits of colored cloth or paper 10, which when the arms are in motion produce the effect of waving handkerchiefs and flags. These arms or levers form what might be well termed a "movable" foreground and when in motion and used in connection with the pictorial background, as hereinafter described, give the necessary movement to simulate life and action of a mass of people. Each of these arms is enlarged, as at 11, which is the end overlying the inclined platform, and thus is overbalanced, so that normally the end 11 will rest upon the platform. Part of these arms are faced with leather or other resilient material 12, which comes into contact with a like padded material 13, arranged upon the inclined platform. Other of the arms are arranged to strike against the plates of a hard material, as 14, while others made from the same material as the inclined platform have nothing upon their striking-faces.

By providing certain of the arms with a resilient material a sound is obtained which imitates to a nicety the clapping of hands, while the arms faced with harder material produce the effect of stamping of the feet. Each of these several arms is pivoted in a suitable bracket 15, arranged below the inclined platform, and have their lower ends 16 projecting into the path of movement of a series of fingers 17, borne upon shafts 18. These fingers 17 are trips which during the rotation of the shafts 18 intermittently engage the lower ends of the levers or arms 9, throwing them upward and away from the inclined platform and permitting them of their own weight to drop back to produce the desired sounds. The several shafts bear sprocket-wheels 19, and an endless chain 20, held in contact with the upper sides of the sprocket-wheels through the medium of guide-rolls 21, forms a driving connection for the several shafts. An operating-handle 22 is conveniently arranged at one end of the apparatus, and upon its movement the several shafts will be rotated at speeds entirely dependent upon the manipulation of the handle 22.

In lieu of sprocket-wheels spur-gears may be used, as shown in Fig. 6, in which case the main shaft 23 bears gears 24, which mesh with intermediate pinions 25, and obviously a rotation of one of the gears by an operating-handle, as 26, will cause the several shafts to be moved in unison.

The trips upon the several shafts may be arranged in any desired manner relatively to each other to produce different effects and in practice are arranged so that the different lines of arms are not actuated at the same instant.

If desired, the operating mechanism for the several arms or levers may be divided into sections, as shown in Figs. 3 and 4, and in this case certain modulations may be secured which more closely portray the effects desired.

Obviously by varying the manipulation of the operating mechanism all sounds and gradations as to effect may be secured, and the effect of a wildly-excited crowd all acting in unison or an assemblage certain sections of which show no delight can be portrayed and reproduced exactly as to the audible and visual effects.

The device and mechanism herein shown and described is not limited to the uses defined above, where the apparatus is in full view of an audience, but may be used behind the scenes to imitate and produce certain effects—as, for instance, the approach of a mass of people or horsemen—and by varying the manipulation of the mechanism it is possible to secure the effect of a cavalcade of horsemen approaching from a great distance and finally rushing upon the scene.

Obviously the details of the mechanism might be varied to a great extent without departing from the purpose and intent of the invention, which contemplates a mechanism which will reproduce the audible and visual effects of a mass of people and certain audible effects of a large body of persons or animals in action.

The device may also be used in connection with drop-scenes and scenes of various densities to produce certain desired illusions.

What I claim as my invention, and desire to secure by Letters Patent, is—

1. In combination in a stage apparatus for producing certain illusory effects, a pictorial background, a series of movable arms arranged in a mass in advance of said background to form a movable foreground in connection with the background, and means for vibrating said movable arms, said movements producing in conjunction with the pictorial background a visual effect simulating a mass of individuals in action.

2. In combination in a stage apparatus, a pictorial background, a series of movable arms arranged in a mass and in advance of said background to form a movable foreground, means appurtenant to said movable members for producing sounds when in movement, said movement producing in conjunction with the pictorial background a visual and audible effect simulating a mass of individuals in action.

3. In a stage apparatus for producing "grand stand" effects, a pictorial background, a plurality of movable members arranged to vibrate in front of said background and forming a movable foreground, means for vibrating said members, and means appurtenant to said movable members for producing audible effects.

4. In a stage apparatus for producing certain illusory effects, a background, a plurality of movable arms or levers projecting through said background and forming a movable foreground of substantially the same extent as the background, and means for moving said levers.

5. In a stage apparatus for producing certain illusory effects, a background bearing certain pictorial characters, a plurality of arms or levers projecting through said background, means borne upon one end of said levers for producing audible effects, and operating mechanism for moving said levers arranged at their opposite ends.

6. In combination in a stage apparatus for producing illusory effects, a background bearing pictorial characters, a series of shafts arranged adjacent to said background, a plurality of arms or levers provided at one end with means for producing visual and audible effects, and connections between the operating-shafts and arms for moving the latter.

7. In combination in a stage apparatus for producing illusory effects, a pictorial background, means for producing visual and audible effects in connection with said background, a series of operating-shafts for controlling the visual and audible effects, toothed wheels borne upon said shafts, and connections for moving said toothed wheels and shafts, in unison.

8. In combination in a stage apparatus for producing illusory effects, a pictorial background, means for producing visible and audible effects in connection with said background said means including a series of movable arms, part of the series of arms having comparatively hard striking-surfaces while other of the arms have resilient striking-surfaces, corresponding hard and resilient surfaces coöperating with the striking-surfaces of the arms for producing sounds simulating hand-clapping and stamping and means for actuating said movable arms.

9. In combination in a stage apparatus for producing illusory effects, a pictorial background, means for producing visible and audible effects in connection with said background, said means including a series of movable arms arranged to vibrate in front of and intermittently strike against the background, the striking-surfaces of part of the arms being comparatively hard while the striking-surfaces of the remainder of the arms are faced with resilient material, and means for vibrating said arms whereby an effect is produced simulating the stamping and hand-clapping of a mass of people.

NEILSON BURGESS.

Witnesses:
  ROBT. B. ROSS,
  JOSEPH O. LUNT.